(12) United States Patent
Mishra

(10) Patent No.: US 11,648,467 B2
(45) Date of Patent: May 16, 2023

(54) STREAMING CHANNEL PERSONALIZATION

(71) Applicant: Microsoft Technology Licensing, LLC, Redmond, WA (US)

(72) Inventor: Mayank Mishra, Issaquah, WA (US)

(73) Assignee: MICROSOFT TECHNOLOGY LICENSING, LLC

( * ) Notice: Subject to any disclaimer, the term of this patent is extended or adjusted under 35 U.S.C. 154(b) by 174 days.

(21) Appl. No.: 16/791,970

(22) Filed: Feb. 14, 2020

(65) Prior Publication Data
US 2021/0252402 A1    Aug. 19, 2021

(51) Int. Cl.
A63F 13/67 (2014.01)
A63F 13/79 (2014.01)
G06N 20/00 (2019.01)
G06K 9/62 (2022.01)

(52) U.S. Cl.
CPC .............. A63F 13/67 (2014.09); A63F 13/79 (2014.09); G06K 9/6215 (2013.01); G06K 9/6262 (2013.01); G06N 20/00 (2019.01); A63F 2300/6027 (2013.01)

(58) Field of Classification Search
CPC .. A63F 13/67; A63F 13/79; A63F 2300/6027; G06N 20/00; G06K 9/6215; G06K 9/6262
See application file for complete search history.

(56) References Cited

U.S. PATENT DOCUMENTS

| 7,878,907 B2 | 2/2011 | Davis et al. |
| 8,506,402 B2 | 8/2013 | Gault et al. |
| 8,825,765 B2 | 9/2014 | Fyock et al. |

(Continued)

FOREIGN PATENT DOCUMENTS

| EP | 1438673 A1 | 7/2004 |
| WO | 2018004839 A1 | 1/2018 |
| WO | 2019074952 A2 | 4/2019 |

OTHER PUBLICATIONS

Hong, et al., "Enabling Adaptive Cloud Gaming in an Open-Source Cloud Gaming Platform", In Journal of IEEE Transactions on Circuits and Systems for Video Technology, vol. 25, Issue 12, Dec. 2015, pp. 2078-2091.

(Continued)

Primary Examiner — Malina D. Blaise
(74) Attorney, Agent, or Firm — Ray Quinney & Nebeker; Tiffany Healy

(57) ABSTRACT

The present disclosure relates to devices and methods for personalizing channel parameters for streaming content to a client device by dynamically adjusting channel parameters in response to learned user preferences. The devices and methods may receive context information from a client device and may send a rank and reward call to a reinforcement learning system for a recommendation for a value of the channel parameters. The rank and reward call may include the context information, a user vector, an item vector and a reward function error. The reinforcement learning system may use the information provided in the rank and reward call to the provide a recommendation for the value of the channel parameters. The devices and methods may use the recommendation to set the value of the channel parameters to stream the content to the client device.

20 Claims, 9 Drawing Sheets

(56) References Cited

U.S. PATENT DOCUMENTS

| | | | |
|---|---|---|---|
| 9,517,410 B2 | 12/2016 | Ahiska et al. | |
| 10,881,964 B1* | 1/2021 | Dills | G06K 9/627 |
| 2014/0075328 A1 | 3/2014 | Hansen et al. | |
| 2014/0274355 A1 | 9/2014 | George et al. | |
| 2017/0050111 A1 | 2/2017 | Perry et al. | |
| 2017/0065889 A1* | 3/2017 | Cheng | A63F 13/497 |
| 2017/0259177 A1 | 9/2017 | Aghdaie et al. | |
| 2017/0264902 A1 | 9/2017 | Ye et al. | |
| 2018/0013844 A1* | 1/2018 | Foged | H04L 51/52 |
| 2018/0013884 A1* | 1/2018 | John | H04L 65/1069 |
| 2019/0373040 A1* | 12/2019 | Grubbs | H04L 65/65 |
| 2020/0053591 A1 | 2/2020 | Prasad | |
| 2020/0145244 A1* | 5/2020 | Hollinger | H04L 12/2809 |
| 2021/0299574 A1* | 9/2021 | Pare | A63F 13/77 |
| 2022/0203228 A1* | 6/2022 | Wiggeshoff | A63F 13/355 |
| 2022/0203232 A1* | 6/2022 | Wiggeshoff | A63F 13/86 |

OTHER PUBLICATIONS

Liu, et al., "QoE-Oriented Rate Adaptation for DASH With Enhanced Deep Q-Learning", In Journal of IEEE Access, vol. 7, Jan. 23, 2019, pp. 8454-8469.

Luo, et al., "Making CNNs for Video Parsing Accessible", In Repository of arXiv:1906.11877v1, Jun. 10, 2019, 10 Pages.

"International Search Report & Written Opinion issued in PCT Application No. PCT/US21/014040", dated Apr. 1, 2021, 14 Pages.

* cited by examiner

STREAMING CHANNEL PERSONALIZATION

BACKGROUND

There exists a class of problems where adjustment of streaming quality leads to better user experience. Simpler heuristic solutions exist, but the heuristic solutions cannot learn and are unable to take into consideration the user preferences about the channel quality during the streaming session, especially when the user is actively engaged in providing input. In addition, heuristic solutions apply a one size fits all solution to adjustment of the streaming quality.

These and other problems exist regarding streaming quality.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a server. The server may include a memory to store data and instructions; at least one processor operable to communicate with the memory, wherein the at least one processor is operable to: establish a connection with a client device to stream a game to the client device; receive context information from the client device; send, to a reinforcement learning system, a rank and reward call for a recommendation for channel parameters for the connection, wherein the rank and reward call includes the context information, a user vector, and an item vector; receive, from the reinforcement learning system, the recommendation for the channel parameters in response to the rank and reward call; and use the recommendation to set a value of the channel parameters to stream the game to the client device.

Another example implementation relates to a method. The method may include establishing a connection between a game server and a client device to stream a game to the client device. The method may include receiving context information from the client device. The method may include sending, to a reinforcement learning system, a rank and reward call for a recommendation for channel parameters for the connection, wherein the rank and reward call includes the context information, a user vector, and an item vector. The method may include receiving, from the reinforcement learning system, the recommendation for the channel parameters in response to the rank and reward call. The method may include using the recommendation to set a value of the channel parameters to stream the game to the client device.

Another example implementation relates to a computer-readable medium storing instructions executable by a computer device. The computer-readable medium may include at least one instruction for causing the computer device to establish a connection with a client device to stream a game to the client device. The computer-readable medium may include at least one instruction for causing the computer device to receive context information from the client device. The computer-readable medium may include at least one instruction for causing the computer device to send, to a reinforcement learning system, a rank and reward call for a recommendation for channel parameters for the connection, wherein the rank and reward call includes the context information, a user vector, and an item vector. The computer-readable medium may include at least one instruction for causing the computer device to receive, from the reinforcement learning system, the recommendation for the channel parameters in response to the rank and reward call. The computer-readable medium may include at least one instruction for causing the computer device to use the recommendation to set a value of the channel parameters to stream the game to the client device.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
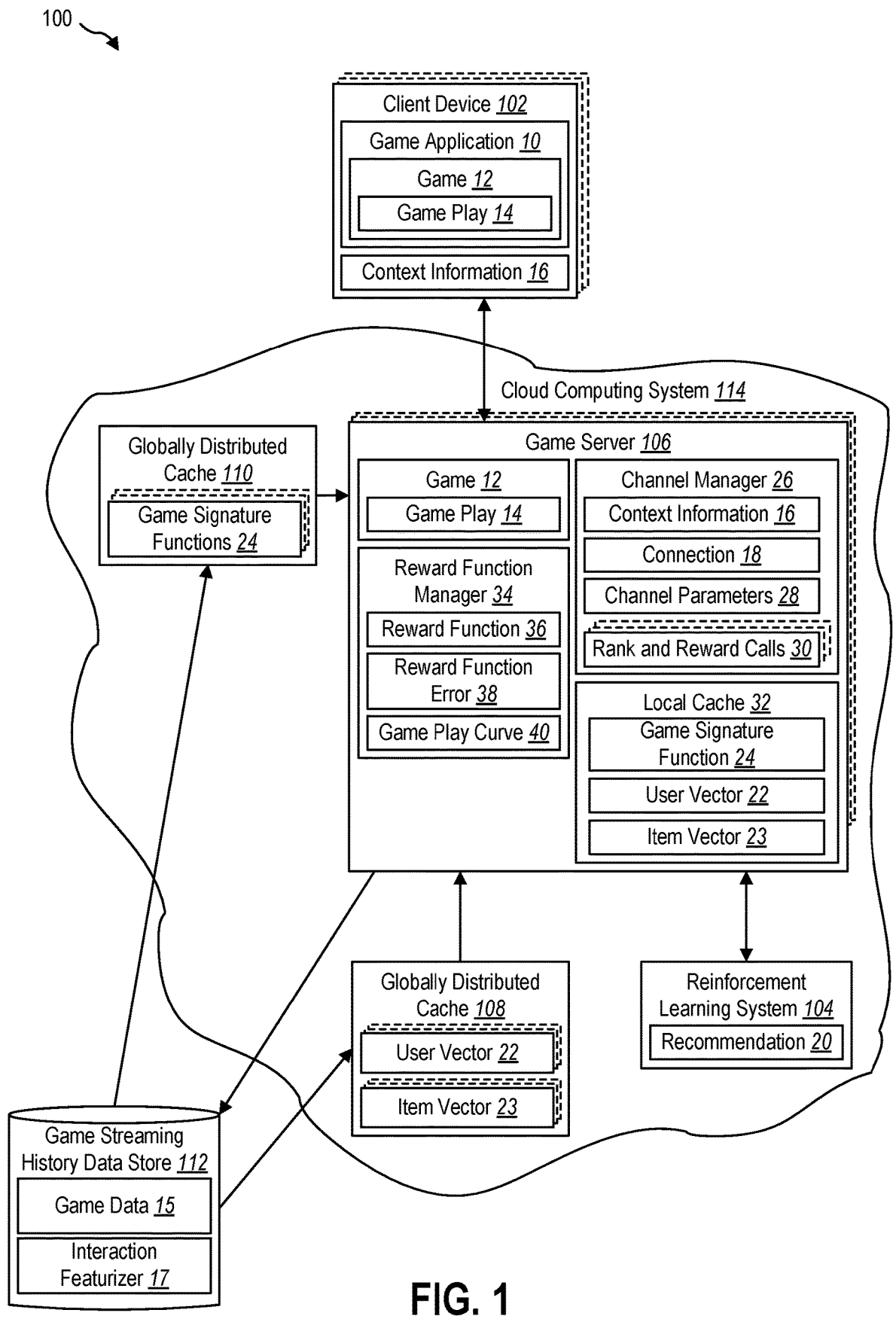
FIG. 1 is a schematic diagram of an example environment of a cloud computing system in accordance with an implementation of the present disclosure.

This disclosure generally relates to providing personalized settings for streaming channels. In the context of game streaming and/or other streaming scenarios requiring streaming channel configuration, optimizing the streaming channel configuration by dynamically switching between streaming channel parameters (e.g., bitrate, forward error correction (FEC), and/or video resolution) in response to user preferences is not straightforward. It is difficult to receive feedback to drive the streaming channel optimization to achieve a feeling of the user that the content is playing well while being streamed. Playing well may include, for example, content streaming on a mobile device at the same quality level as on a gaming console. Each user may have a different idea of what playing well means. For example, one user may be okay with higher jitter during content streaming but not okay with high latency. While another user may be okay with high latency during content streaming but not okay with high jitter and/or low resolution.

As such, the feeling a user may have that the content is playing well may be personal to the user. In addition, it is difficult to receive feedback from users regarding user preferences. Best in class user experience needs to be provided in consonance with real time user feedback. However, capturing user feedback in a high input scenario, such as, gaming, is not trivial. In order to achieve the feeling that the content is playing well while streaming requires dynamic channel parameter switching with sub second latency.

The present disclosure includes several practical applications that provide benefits and/or solve problems associated with personalization of streaming channels. The devices and methods may personalize the streaming channel to a client device of a user via a triangulation of a user interaction history, real time user dynamic context features, and real time adjustments of streaming channel parameters to maximize a reward function that captures the plays well feeling for the user. The devices and methods may collect, or otherwise acquire, the subjective user preferences (e.g., the plays well feeling) via streaming channel configuration dynamism without having to explicitly ask the user for feedback.

The devices and methods may emulate the user feedback by learning game signature functions for each game in the system. The game signature functions may be learned per game per user and/or per a cohort of users. The game signature functions may be mathematical functions that encapsulate a plays well feeling per game, per user cohort, if applicable.

The devices and methods use a cloud computing system to stream games to client devices so that users may play a game on any client device. A cloud computing system refers to a collection of computing devices capable of providing remote services and resources. The devices and methods may dynamically adjust the channel parameters configuration continuously for a connection used to stream the game from a game server to the client device such that the error between an actual play function and the game signature function is continuously minimized as the game play progresses.

The devices and methods aid the dynamic adjustments to the channel configuration with the triangulation of a user interaction history, real time user dynamic context features, and real time adjustments to streaming channel parameters to maximize a reward function that captures the plays well feeling for the user. User interaction history may be captured in terms of a low dimensional latent embedding vector and made available globally via a globally distributed cache.

The dynamic features of the game play may be relayed from a gaming device of the user to a game streaming server via application program interface (API) calls. The API calls may be augmented on the gaming server with features from the latent embedding vector and fed into a contextual bandit that continuously learns a policy to maximize the reward function of plays well using streaming channel parameters. Each actual game play curve may feedback and update into the mathematical function being optimized for that game play session, thereby tracking shifts (if any) in user preferences over time.

The methods and devices may continuously learn the reward function for capturing subjective user preferences without requiring human intervention. The reward functions may be used alongside dynamic user context features to feed a contextual bandit aided with latent user vectors and/or item vectors capturing interaction history over past few months and/or years to help the end to end system continuously learn an optimal policy for providing best in class plays well experiences to the end user via dynamic streaming channel configuration. As such, the method and devices may identify and/or otherwise collect changing user preferences over time without asking the user.

The methods and devices may personalize the channel parameters by dynamically changing the configuration of the streaming parameters for each user while streaming the game to the client device. By personalizing the channel parameters, the present disclosure may achieve a feeling that the game is playing well on the client device for each individual user based on learned user preferences. Personalizing the channel parameters may result in increase user satisfaction with the game system and/or higher user ratings of the game system. Moreover, the gaming system may retain users longer and increase user engagement with the system when users are happy with the performance of the game system. In addition, revenue may increase through increased user engagement with the game system.

Referring now to FIG. 1, illustrated is an example environment 100 including a cloud computing system 114 for use with providing personalized settings for streaming channels when streaming one or more games 12 from game servers 106 on the cloud computing system 114 to client devices 102. Cloud computing system 114 may include a plurality of game servers 106 in communication with a plurality of client devices 102. Providing personalized settings for streaming channels may include, but is not limited to, dynamically adjusting channel parameters 28 of the channel or connection 18 used to stream games 12 to client devices 102 in response to learned user preferences for game play and/or channel conditions. By personalizing the settings for the streaming channels users may play games 12 on client devices 102 and have a feeling that game 12 is playing well on client devices 102.

A user may open a game application 10 on client device 102 to select one or more games 12 to play on client device 102. Game application 10 may communicate with cloud computing system 114 and may provide a list of available games 12 from cloud computing system 114. When the user selects a game 12 to play from the list of available games, game application 10 may send a request to cloud computing system 114 with the selected game 12. Cloud computing system 114 may initialize a game server 106 to provide game 12 to client device 102. A connection 18 may be established between game server 106 and client device 102 via a network so that game 12 may be streamed to client device 102 using connection 18 and the user may play game 12 using client device 102.

The client devices 102 may refer to various types of computing devices. For example, one or more of the client devices 102 may include a mobile device such as a mobile telephone, a smart phone, a personal digital assistant (PDA), a tablet, or a laptop. Additionally, or alternatively, the client devices 102 may include one or more non-mobile devices such as a desktop computer, server device, or other non-portable device. The client device 102 may refer to dedicated gaming devices (e.g., handheld gaming devices) or a video game console in communication with a display device. In one or more implementations, one or more of the client devices 102 include graphical user interfaces thereon (e.g., a screen of a mobile device). In addition, or as an alternative, one or more of the client devices 102 may be communicatively coupled (e.g., wired or wirelessly) to a display device having a graphical user interface thereon for providing a display of application content. The game server(s) 106 may similarly refer to various types of computing devices. Each of the devices and/or components of the environment 100 may include features and functionality described below in connection with FIG. 8.

Cloud computing system 114 may also include a globally distributed cache 108 in communication with game servers 106. Globally distributed cache 108 may be a datastore that stores a plurality of user vectors 22. The plurality of user vectors 22 may provide a mathematical representation of the gaming history for the users of cloud computing system 114. Each user of the gaming system may have an associated user vector 22. User vectors 22 may be a multidimensional array of numbers that provides a condensed representation of the game play for the user for every game 12 played by the user. For example, user vectors 22 may embed one or more user actions during game play. In addition, user vectors 22 may provide a variety of information about the user, such as, but not limited to, a level of play for the user, an amount of money the user spends on games, an amount of time a user plays game, types of games the user plays, and/or a speed of play of the user. In addition, the one or more user vectors 22 may illustrate similarities between groups of users. The one or more user vectors 22 may also illustrate differences between groups of users. As such, user vectors 22 may provide a summary of the total gaming history for each user of the cloud computing system 114.

In addition, globally distributed cache 108 may include one or more item vectors 23. Item vectors 23 may provide additional game information and/or game features associated with one or more games 12. For example, item vectors 23 may embed one or more user actions during game play. In addition, item vectors 23 may relate to other items of interest relating to games 12. Item vectors 23 may be a multidimensional array of numbers that provide a condensed representation of the game information and/or game sessions for every game 12 of cloud computing system 114. Each game 12 of the gaming system may have an associated item vector 23. In an implementation, games 12 may have a plurality of item vectors 23 associated with the users. The one or more item vectors 23 may illustrate similarities between games 12 and/or gaming sessions. In addition, the one or more item vectors 23 may illustrate differences between games 12 and/or gaming sessions. The item vectors 23 may provide a summary of game information for each game 12 of the cloud computing system 114.

In an implementation, user vectors 22 and/or item vectors 23 may be generated offline through a deep machine learning network. Examples of deep machine learning networks may include, but are not limited to, wide and deep learning and/or Extreme Deep Factorization Machine (xDeepFM). A game streaming history datastore 112 may communicate with cloud computing system 114 and may contain game data 15 for cloud computing system 114. Game data 15 may include information acquired or otherwise collected for all games 12 in cloud computing system 114 and/or all users in cloud computing system 114. Examples of game data 15 may include, but are not limited to, game names, game content, an amount of time users are playing games, an amount of money spent on games, and/or actual game play of users. The game data 15 may be continuously updated as games 12 are created and/or played by users of cloud computing system 114.

Game streaming history datastore 112 may apply an interaction featurizer 17 that may be trained to analyze game data 15 and generate user vectors 22 for each user of the cloud computing system 114 and/or item vectors 23 for each game 12 of cloud computing system 114. In an implementation, the interaction featurizer 17 may be a deep learning machine model. The interaction featurizer 17 may run at a predetermined time period to ensure user vectors 22 and/or item vectors 23 reflect the latest gaming information received for the users. For example, the interaction featurizer 17 may run every four hours. Another example may include the interaction featurizer 17 running once a day.

In an implementation, interaction featurizer 17 may also be trained to analyze game data 15 and provide one or more game recommendations in response to the analysis. One example game recommendation may include providing a top list of recommended games for a user to play. For example, the interaction featurizer 17 may use the user information and/or user game interaction data stored in game streaming history datastore 112 to narrow down the entire catalogue of games to a recommended list of games for the user to play (e.g., the top ten recommended games out of 300 games).

The one or more user vectors 22 and/or item vectors 23 may be distributed to globally distributed cache 108. As new game data 15 is received from game servers 106 and/or game data 15 is updated, the interaction featurizer 17 may be applied to game data 15. User vectors 22 and/or item vectors 23 may be updated and/or revised as necessary as game data 15 is updated. As the user interaction history changes, user vectors 22 may be updated to reflect the changes to the user interaction history changes. In addition, as the game data 15 changes, item vectors 23 may be updated to reflect the changes to the game information. As such, the globally distributed cache 108 may include continuously updated user vectors 22 that provide a game history summary for each user of cloud computing system 114 and/or item vectors 23 that provide a summary of the games 12 of cloud computing system 114.

In addition, cloud computing system 114 may include a globally distributed cache 110 in communication with game servers 106. Globally distributed cache 110 may be a datastore for one or more game signature functions 24 for each game 12. Game signature functions 24 may identify an optimal game play curve for the game under good network conditions. An optimal game play curve may represent over a plurality of game sessions how a user (e.g., an expert player, a new gamer, and/or a casual gamer) provides input via a game controller that may best achieve the mission or end result of the game the user is playing. The optimal game play curve may use a plurality of factors in gauging an optimal game play curve. In one example, the optimal game play curve may be represented by plotting the input frame and bytes count of the input provided via the game controller by the user plotted against time.

In an implementation, game signature functions 24 may be generated offline through deep machine learning. The game signature functions 24 may be generated from the game data 15 in game streaming history datastore 112. A trained machine learning model may mine the game data 15 and may learn the equation of the curve for one or more game signature functions 24 for each game 12. The trained machine learning model may continuously update the game signature functions 24 for each game 12 as the gaming data 15 changes.

The trained machine learning model may split the user population into different cohorts and may learn one or more game signature functions 24 differently for each cohort of users. Example cohorts may include, but are not limited to, casual gamers, powerhouse gamers, new gamers, and/or gamers in different geographic regions. For example, the trained machine learning model may analyze the game data 15 for users identified in the cohorts to derive the game signature function 24 for each game 12 for each cohort. The machine learning model may identify similarities in the game data 15 and may determine an optimal game play curve based on the analysis of the game data 15. Different game signature functions 24 may be determined for each game 12 and/or a plurality of games 12.

For example, one game signature function 24 for game 12 may be for casual gamers (e.g., users who play games infrequently), while a different game signature function 24 may be used for game 12 for powerhouse gamers (e.g., users who play games frequently). As such, the machine learning model may identify a group of users identified as casual gamers and may identify patterns in the game play of the casual gamers to derive the optimal game play for casual gamers for game 12, while identifying a different group of users identified as powerhouse gamers (e.g., gamers with a high number of playing hours and/or gamers that have been identified as good players) and analyzing the game play of the powerhouse users to derive the optimal game play for powerhouse gamers for game 12. Another example may include using different game signature functions 24 for different geographic regions. For example, one game signature function 24 may be derived from game data 15 for users in North America, while a different game signature function 24 may be derived from game data 15 for users in Europe. Another example may include using a game signature function 24 for new gamers. For example, the game signature function 24 may be derived by analyzing the game play of new gamers in general and/or new gamers to the game 12. Another example may include using the same game signature function 24 for a plurality of similar games 12. For example, if games 12 included similar features and/or game play, the same optimal game signature function 24 may be used for the similar games 12. As such, the game signature functions 24 may be developed at any level of granularity for the games 12.

The game signature functions 24 may be distributed to globally distributed cache 110. As the game data 15 changes and/or is updated, the game signature functions 24 may change. As such, the game signature functions 24 may reflect any shifts in user preferences over time for games 12.

Globally distributed caches 108, 110 may allow user vectors 22, item vectors 23, and/or the game signature functions 24 to be available to all game servers 106 within cloud computing system 114. As game servers 106 are initialized, each game servers 106 may have access in real time or near real time to the most recent copies of user vectors 22, item vectors 23, and/or the game signature functions 24 available in the globally distributed caches 108, 110. Thus, regardless of the geographic locations of game servers 106, each game server 106 may be able to access user vectors 22, item vectors 23, and/or the game signature functions 24. Moreover, more than one game server 106 may be able to receive a copy of user vectors 22, item vectors 23, and/or the game signature functions 24 at the same time. In another implementation, user vectors 22, item vectors 23, and/or the game signature functions 24 may be stored in a single globally distributed cache in communication with game servers 106.

Upon initialization of game server 106 in response to a user selecting game 12 to play, game server 106 may access a copy of user vector 22 for the user from globally distributed cache 108. For example, game server 106 may identify the user of client device 102 using a client identification and/or user account information associated with the user and may access the corresponding user vector 22 for the user. Game server 106 may store user vector 22 in a local cache 32. Game server 106 may also identify one or more item vectors 23 associated with game 12 and may save a copy of the one or more item vectors 23 in local cache 32. In addition, game server 106 may identify one or more game signature functions 24 for the requested game 12 in the globally distributed cache 110 and may save the one or more game signature functions 24 for game 12 in local cache 32. In an implementation, game server 106 may save the game signature function 24 for a cohort associated with the user. For example, if the user is a causal gamer, game server 106 may save the game signature function 24 for causal gamers for game 12 in local cache 32.

Game server 106 may include a channel manager 26 that may establish a connection 18 via a network to stream game 12 to client device 102. Channel manager 26 may receive context information 16 from client device 102 and may use the context information 16 in establishing connection 18. Context information 16 may provide the current context of client device 102 and/or the user. Context information 16 may include, for example, a network type for connection 18 (e.g., Wi-Fi or cellular), a network speed for connection 18, bandwidth constraints for connection 18, a geographic location of client device 102, whether client device 102 is in motion, and/or an amount of remaining battery power for client device 102. Context information 16 may dynamically change as the context of client device 102 and/or the user changes. For example, the network may go down or the user may move geographic locations, resulting in changes to the context information 16. In an implementation, client device 102 may send context information 16 to game server 106 using a rank and reward call.

Channel manager 26 may use the initial context information 16 received from client device 102 in establishing connection 18. Channel manager 26 may communicate with a reinforcement learning system 104 in determining initial values for channel parameters 28 for connection 18. Channel parameters 28 may include, but are not limited to, video bitrate, resolution, bandwidth, forward error correction (FEC), smooth rendering, rendering, one or more types of jitter, and/or one or more types of latency (e.g., input latency or decode latency) used when streaming game 12 to client device 102. Channel manager 26 may send a rank and reward call 30 with the context information 16, user vector 22, and/or item vector 23 to reinforcement learning system 104.

In an implementation, channel manager 26 may receive other recommendations for channel parameters 28 for connection 18 from other systems operating on server 106. For example, the other recommendations for channel parameters 28 for connection 18 may be based on heuristics applied to the context information 16. However, the other systems may be unable to address learnability and/or may unable to personalize the recommendations. The rank and reward call 30 may include the other recommendations for channel parameters 28.

Cloud computing system 114 may also include a reinforcement learning system 104. Reinforcement learning system 104 may be a machine learning system that may provide one or more recommendations 20 for values for the channel parameters 28 in response to learning from feedback from previous recommendations 20. One example of reinforcement learning system 104 may include a contextual bandit. The components of the reinforcement learning system 104 may include hardware, software, or both. For example, the reinforcement learning system 104 may include one or more instructions stored on a computer-readable storage medium and executable by processors of one or more computing devices. When executed by the one or more processors, the computer-executable instructions of one or more computing devices (e.g., reinforcement learning system 104) can perform one or more methods described herein. Alternatively, the components of the reinforcement learning system 104 may include hardware, such as a special purpose processing device to perform a certain function or group of functions. Additionally, or alternatively, the components of the reinforcement learning system 104 may include a combination of computer-executable instructions and hardware.

Reinforcement learning system 104 may use the information provided in the rank and reward call 30 from game server 106 (e.g., context information 16, user information provided with user vector 22, game information provided with item vector 23, and/or any other recommendations for channel parameters) in determining a recommendation 20 for the initial values for the channel parameters 28 for connection 18. For example, the recommendation 20 may include initial values for the bit rate, the resolution, a level for FEC, and whether to use short-term or long-term rendering. Another example may include providing one recommendation 20 for targeting one type of latency and/or jitter and a different recommendation 20 for targeting a different type of latency and/or jitter. Yet another example may include providing a recommendation 20 to target only one type of latency and/or jitter.

Channel manager 26 may establish connection 18 using the recommended values for channel parameters 28 and game server 106 may stream game 12 to client device 102 using the values for channel parameters 28. Game server 106 may receive game play 14 of the user while the user is playing game 12. For example, the game play 14 may collect the actions performed by the user while playing game 12.

Game server 106 may include a reward function manager 34 that may build a game play curve 40 using the game play 14 received for the user. The game play curve 40 may build a graph representing a current game play 14 for the user. For example, the game play curve 40 may illustrate the actions performed by the user for game 12 while playing game 12. A game play curve 40 may be generated each time a user plays game 12. As such, users may have different game play curves 40 for different gaming sessions.

Reward function manager 34 may also determine a reward function 36 to use in aiding the reinforcement learning system 104 in understanding a success of the recommendation 20 for the channel parameters 28 for connection 18. In an implementation, the reward function 36 may include comparing the game play curve 40 to the game signature function 24 and determining a reward function error 38 in response to the comparison. The reward function error 38 may include the distance between the game play curve 40 and the game signature function 24. As such, the game signature function 24 may be a segue between the user preferences and the channel configurations for connection 18. Reward function manager 34 may continuously learn the reward function 36 as the game play 14 progresses for the user and may use the reward function 36 for capturing subjective user preferences without requiring human intervention. As such, each user may have different preferences that may be learned through using the reward function 36.

The reward function error 38 may be included in the rank and reward calls 30 to reinforcement learning system 104 and may be used by reinforcement learning system 104 to modify and/or change the recommendation for the channel parameters 28. The reinforcement learning system 104 may continue to provide recommendations for adjusting the channel parameters 28 until the reward function error 38 is within a threshold level. In an implementation, the threshold level may be a positive number. For example, if the reward function error 38 is negative (e.g., there is a large distance between the game play curve 40 and the game signature function 24), the reinforcement learning system 104 may use this feedback to continue to recommend adjustments to the channel parameters 28 to attempt to lower the distance between the game play curve 40 and the game signature function 24 to move the reward function error 38 towards a positive number. By switching the channel conditions, reinforcement learning system 104 may improve the streaming conditions of game 12 to the user. Thus, the reinforcement learning system 104 may use the changes in the reward function error 38 as positive and/or negative feedback on the recommended changes for the channel parameters and may modify a next round of recommendations in response to the feedback provided by the reward function error 38.

Client device 102 may periodically send the context information 16 to game server 106 at a predetermined time interval (e.g., every five or ten seconds) while game 12 is being streamed to client device 102. As such, client device 102 may provide updated context information 16 for client device 102 throughout the duration of the game play 14. In addition, client device 102 may be triggered, or otherwise forced, to send the context information 16 to game server 106 in response to changes in the context. For example, a user switching from a Wi-Fi network to cellular network may trigger the sending of context information 16 to game server 106.

Channel manager 26 may receive the context information 16 from client device 102 and may send a new rank and reward call 30 to reinforcement learning system 104 at a predetermined time interval for a new recommendation 20 for the channel parameters 28 for connection 18. A plurality of rank and reward calls 30 may be sent to reinforcement learning system 104 throughout the duration of game play 14 at predetermined time intervals in response to a predetermined frequency and/or triggers for sending the rank and reward calls 30. For example, in a one hour game, new rank and reward calls 30 may be sent every ten seconds. The new rank and reward call 30 may include the context information 16, user vector 22, item vector 23, and the reward function error 38.

Reinforcement learning system 104 may use the information provided in the rank and reward call 30 to make a new recommendation 20 for the channel parameters 28 for connection 18. The new recommendation 20 may include changing the values of the channel parameters 28 and/or maintaining the values of the channel parameters 28. Reinforcement learning system 104 may reply to the rank and reward call 30 with the new recommendation 20 for the values of the channel parameters 28.

For example, when the context information 16 changes, the recommendation 20 may include new values for the channel parameters 28. The context information 16 may indicate spikes in the network jitter, as such, the reinforcement learning system 104 may recommend switching from a short-term rendering mode to a long-term rendering mode. Another example may include the context information 16 remaining the same while the reward function error 38 is high, the recommendation 20 may include new values for the channel parameters 28 in response to the high value for the reward function error 38. In one example, the reinforcement learning system 104 may recommend changing the video bitrate from 5.5 mbps to 10 mbps and may recommend keeping the same values for resolution, the levels of FEC, and using the same rendering. In another example, the reinforcement learning system 104 may recommend lowering the resolution value to below 720 p and change the rendering from a long-term mode to a short-term mode, while keeping the bit rate and the FEC values the same. As such, the reinforcement learning system 104 may recommend changing all values of the channel parameters 28 and/or may recommend changing a subset of the values of the channel parameters 28 in response to the information and/or feedback provided to the reinforcement learning system 104 through the rank and reward calls 30.

In an implementation, reinforcement learning system 104 may use the reward function error 38 and/or the information received to continuously learn so that the recommendations 20 for the channel parameters 28 for connection 18 may improve in response to learning from outcomes from previous recommendations 20. In addition, reinforcement learning system 104 may use information learned from other users in cloud computing system 114 in generating recommendations 20. A plurality of game servers 106 may communicate with reinforcement learning system 104 and reinforcement learning system 104 may use the information learned from each game server 106 in generating recommendations 20.

Channel manager 26 may receive the recommendation 20 from reinforcement learning system 104 and may use the values for the channel parameters 28 to modify the channel parameters 28 of connection 18. As such, channel manager 26 may continue to adjust the channel parameters 28 of connection 18 in response to recommendations 20 provided by reinforcement learning system 104 until the reward function error 38 is within a threshold level and/or a request to stop game play 14 is received.

When a request to stop game play 14 is received, the game play data collected by game server 106 during the playing of game 12 may be transmitted to game streaming history datastore 112. For example, the game play data may be sent at the end of the game play 14 or may be transmitted at the end of the day so that all the game play data received for the day may be transmitted at once to the game streaming history datastore 112. The game streaming history datastore 112 may be continuously updated with new game data 15 collected by game servers 106 on the cloud computing system 114.

As such, environment 100 may continuously learn the reward function 36 for capturing subjective user preferences without requiring human intervention. The reward function 36 may be used alongside dynamic user context information 16 to feed a reinforcement learning system 104 aided with latent user vectors 22 capturing user interaction history over the past few months and/or years to help the end to end system continuously learn an optimal policy for providing best in class plays well experiences to the end user via dynamic streaming channel configuration. Thus, environment 100 may use the triangulation of the reward function 36, the dynamic user context information 16, game information provided in the item vectors 23, and the gaming history summary of the user provided in user vectors 22 to learn the subjectivity of the user preferences and dynamically adjust the channel conditions for the game streaming to personalize the gaming experience for the user.

Each of the components (e.g., game 12, channel manager 26, reward function manager 34, and/or local cache 32) of the game server 106 may be in communication with each other using any suitable communication technologies. In addition, while the components of the game server 106 are shown to be separate in FIG. 1, any of the components or subcomponents may be combined into fewer components, such as into a single component, or divided into more components as may serve a particular implementation.

Moreover, the components of the game server 106 may include hardware, software, or both. For example, the components of the game server 106 may include one or more instructions stored on a computer-readable storage medium and executable by processors of one or more computing devices. When executed by the one or more processors, the computer-executable instructions of one or more computing devices (e.g., server device(s) 106) can perform one or more methods described herein. Alternatively, the components of the game server 106 may include hardware, such as a special purpose processing device to perform a certain function or group of functions. Additionally, or alternatively, the components of the game server 106 may include a combination of computer-executable instructions and hardware.

Figure 2A:
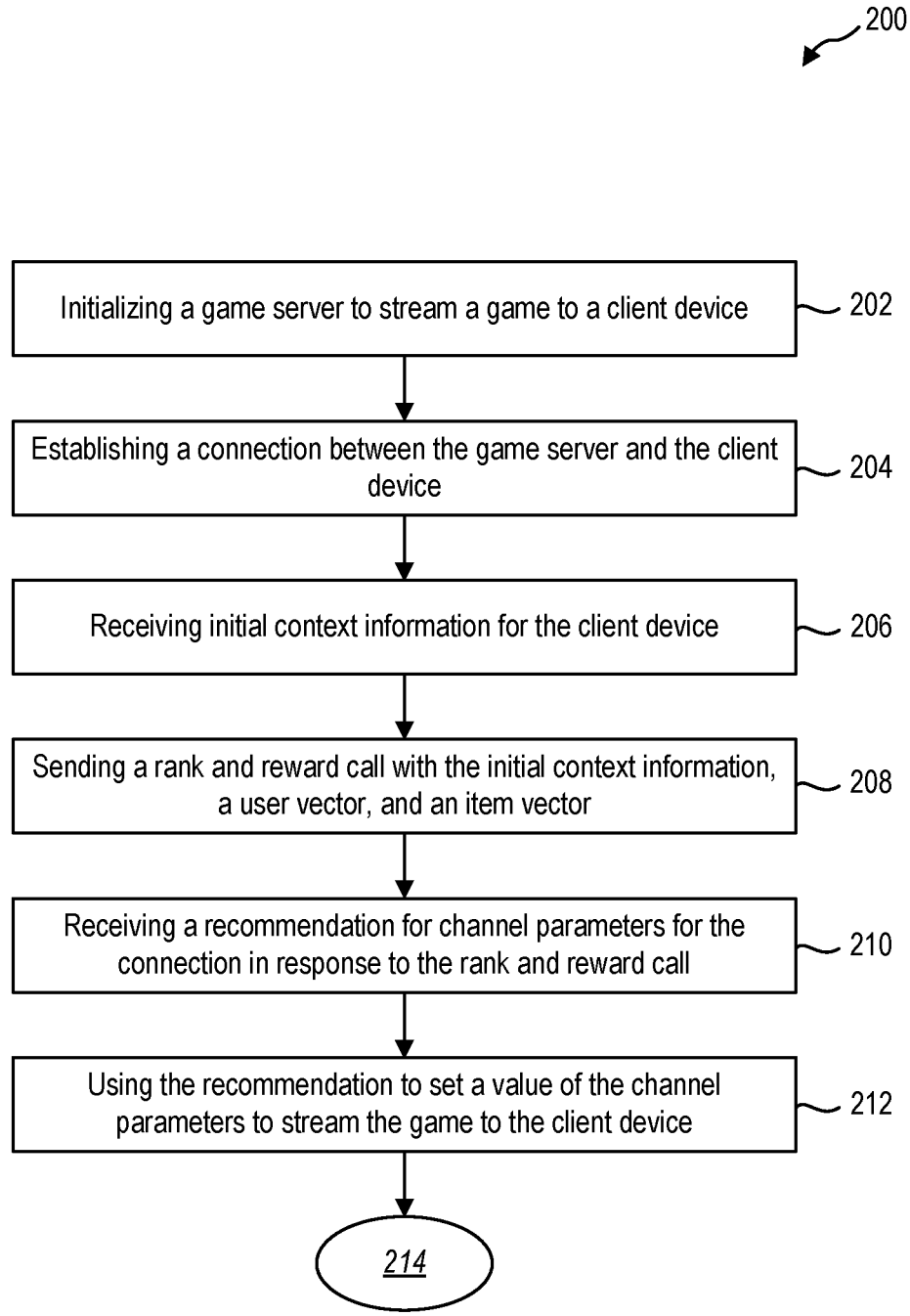
FIGS. 2A and 2B illustrate an example method flow for personalizing channel parameters for streaming content in accordance with an implementation of the present disclosure.
Figure 2B:
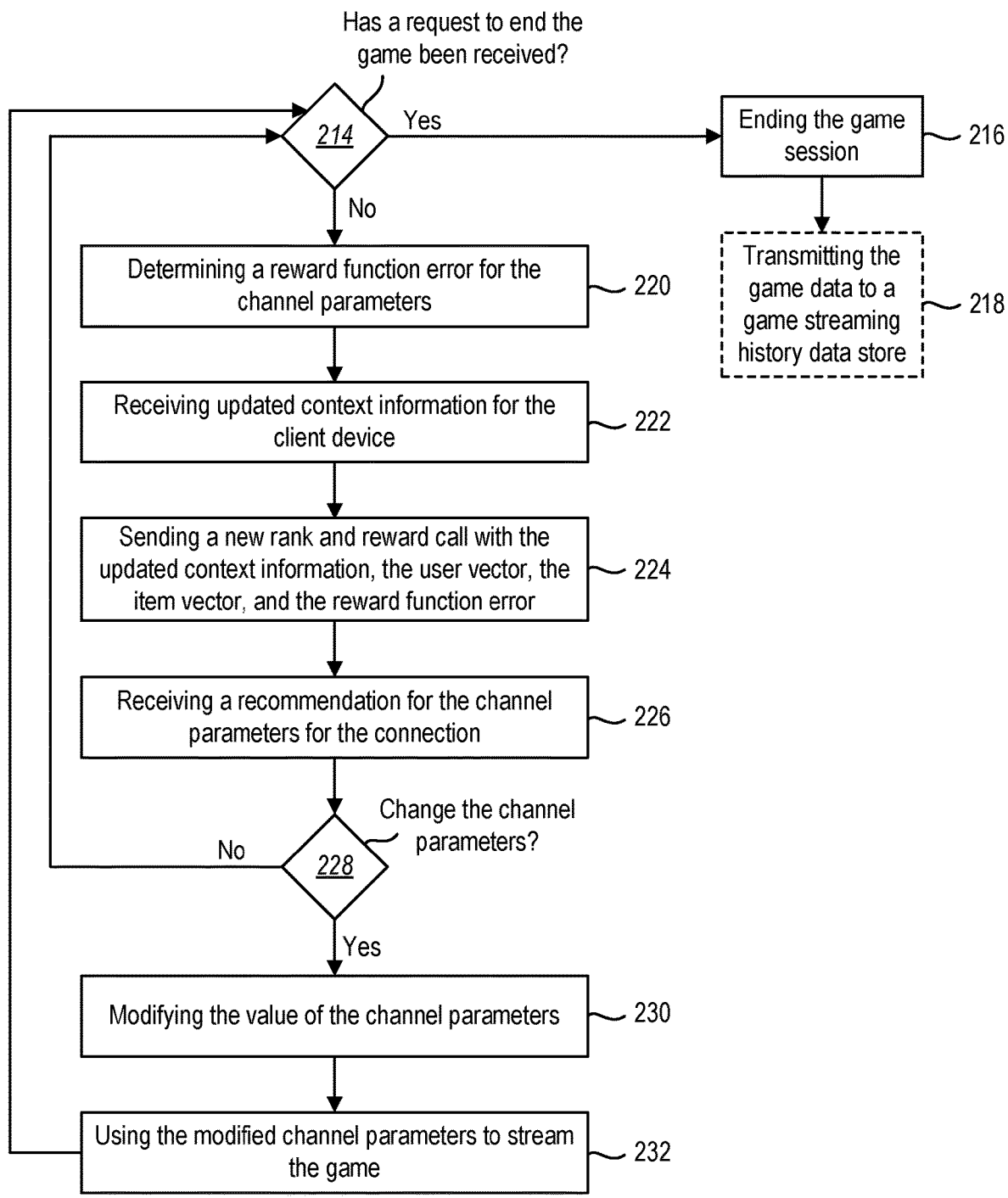

Referring now to FIGS. 2A and 2B, an example method 200 may be used by game server 106 (FIG. 1) for personalizing channel parameters 28 (FIG. 1) for streaming content to client device 102 (FIG. 1). While method 200 is discussed in connection with streaming a game 12 to a client device 102, it should be appreciated that method 200 may be used by any server device to stream any form of content to a client device 102. The actions of method 200 may be discussed below with reference to the architecture of FIG. 1.

At 202, method 200 may include initializing a game server to stream a game to a client device. Cloud computing system 114 may initialize a game server 106 to stream game 12 to client device 102 in response to a user selecting game 12 to play from a list of available games in a game application 10.

At 204, method 200 may include establishing a connection between the game server and the client device. Game server 106 may include a channel manager 26 that may establish the connection 18 via a network to stream game 12 to client device 102 so that game 12 may be streamed to client device 102.

At 206, method 200 may include receiving initial context information for the client device. Channel manager 26 may receive initial context information 16 from client device 102 and may use the initial context information 16 in establishing connection 18. Context information 16 may provide the current context of client device 102 and/or the user. Context information 16 may include, for example, a network type for connection 18 (e.g., Wi-Fi or cellular), a network speed for connection 18, bandwidth constraints for connection 18, a geographic location of client device 102, whether client device 102 is in motion, and/or an amount of remaining battery power for client device 102. In an implementation, client device 102 may send context information 16 to game server 106 using a rank and reward call.

At 208, method 200 may include sending a rank and reward call with the initial context information, a user vector, and an item vector. Channel manager 26 may communicate with a reinforcement learning system 104 in determining initial values for channel parameters 28 for connection 18. Channel parameters 28 may include, but are not limited to, video bitrate, resolution, bandwidth, forward error correction (FEC), smooth rendering, rendering, one or more types of jitter, and/or one or more types of latency (e.g., input latency or decode latency) used when streaming game 12 to client device 102.

Channel manager 26 may send a rank and reward call 30 to reinforcement learning system 104. Reinforcement learning system 104 may be a machine learning system that may provide one or more recommendations 20 for values for the channel parameters 28 in response to learning from feedback from previous recommendations 20. One example of reinforcement learning system 104 may include a contextual bandit.

The rank and reward call 30 may include the context information 16, user vector 22, and item vector 23. Upon initialization of game server 106 in response to a user selecting game 12 to play, game server 106 may access a copy of user vector 22 for the user and/or a copy of one or more item vectors 23 for game 12 from globally distributed cache 108. For example, game server 106 may identify the user of client device 102 using a client identification and/or user account information associated with the user and may access the corresponding user vector 22 for the user. In addition, game server 106 may access a corresponding item vector 23 for game 12 from the globally distributed cache 108. Game server 106 may store user vector 22 and/or item vector 23 in a local cache 32.

User vectors 22 may be a multidimensional array of numbers that provides a condensed representation of the game play for the user for every game 12 played by the user. One example multidimensional array may include a forty dimensional array. For example, user vectors 22 may embed one or more user actions during game play. In addition, user vectors 22 may provide a variety of information about the user, such as, but not limited to, a level of play for the user, an amount of money the user spends on games, an amount of time a user plays game, types of games the user plays, and/or a speed of play of the user. In addition, the one or more user vectors 22 may illustrate similarities between groups of users. As such, user vectors 22 may provide a summary of the total gaming history for each user of the cloud computing system 114.

Item vectors 23 may provide additional game information and/or game features associated with one or more games 12. For example, item vectors 23 may embed one or more user actions during game play. In addition, item vectors 23 may relate to other items of interest relating to games 12. Item vectors 23 may be a multidimensional array of numbers that provide a condensed representation of the game information and/or game sessions for every game 12 of cloud computing system 114. One example multidimensional array of numbers may include a fifty dimensional array of numbers. The one or more item vectors 23 may illustrate similarities between games 12 and/or gaming sessions. In addition, the one or more item vectors 23 may illustrate differences between games 12 and/or gaming sessions. The item vectors 23 may provide a summary of game information for each game 12 of the cloud computing system 114.

At 210, method 200 may include receiving a recommendation for channel parameters for the connection in response to the rank and reward call. Reinforcement learning system 104 may use the information provided in the rank and reward call 30 from game server 106 (e.g., context information 16, user information provided with user vector 22, item vector 23, and/or any other recommendations for channel parameters) in determining a recommendation 20 for the initial values for the channel parameters 28 for connection 18. For example, the recommendation 20 may include initial values for the bit rate, the resolution, a level for FEC, and whether to use short-term or long-term rendering. Reinforcement learning system 104 may reply to the rank and reward call 30 with the recommendation 20 for the values of the channel parameters 28.

At 212, method 200 may include using the recommendation to set a value of the channel parameters to stream the game to the client device. Channel manager 26 may establish connection 18 using the recommended values for channel parameters 28 and game server 106 may stream game 12 to client device 102 using the values for channel parameters 28.

At 214, method 200 may include determining whether a request to end the game has been received. Game server 106 may determine whether receive a request to stop game play 14 is received from client device 102.

At 216, method 200 may include ending the game session in response to receiving a request to end the game. Game server 106 may end the game session for game 12 and may remove the connection 18 between game server 106 and the client device 102.

At 218, method may optionally include transmitting the game data to a game streaming history data store. The game play data collected by game server 106 during the playing of game 12 may be transmitted to game streaming history datastore 112 at the end of the game play. For example, the game play data may be sent at the end of the game play 14 or may be transmitted at the end of the day so that all the game play data received for the day may be transmitted at once to the game streaming history datastore 112. As such, the game streaming history datastore 112 may be continuously updated with new game data 15 collected by game servers 106 on the cloud computing system 114.

At 220, method 200 may include determining a reward function error for the channel parameters in response to an indication for the continuation of game play. Game server 106 may include a reward function manager 34 that may use the current game play 14 to determine a reward function error 38 for the values selected for the channel parameters 28.

As such, method 200 may personalize the streaming channel to a client device 102 of a user via a triangulation of a user interaction history, real time user dynamic context features, and real time adjustments of streaming channel parameters 28 to maximize a reward function that captures the plays well feeling for the user.

Figure 3:
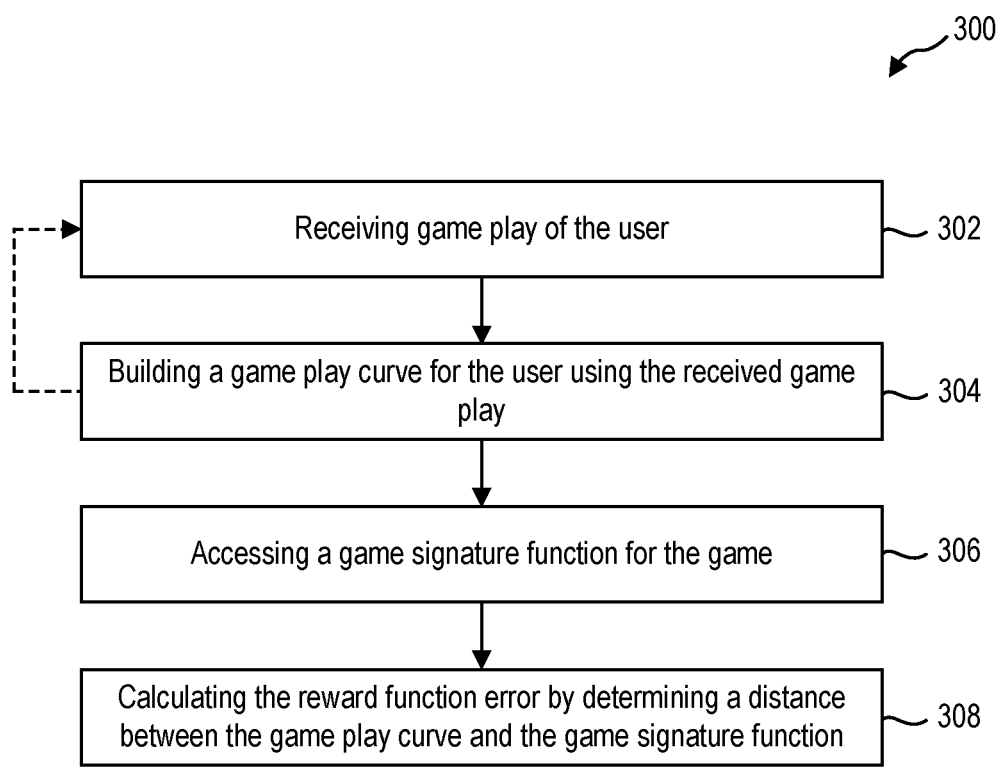
FIG. 3 illustrates an example method flow for determining a reward function error in accordance with an implementation of the present disclosure.

Referring now to FIG. 3, an example method 300 may be used by game server 106 for determining a reward function error 38 (FIG. 1). The actions of method 300 may be discussed below with reference to the architectures of FIG. 1.

At 302, method 300 may include receiving game play of the user. Game server 106 may receive game play 14 of the user while the user is playing game 12. For example, the game play 14 may collect the actions performed by the user while playing game 12.

At 304, method 300 may include building a game play curve for the user using the received game play. Game server 106 may include a reward function manager 34 that may build a game play curve 40 using the game play 14 received for the user. The game play curve 40 may build a graph representing a current game play 14 for the user. For example, the game play curve 40 may illustrate the actions performed by the user for game 12 while playing game 12. A game play curve 40 may be generated each time a user plays game 12. As such, users may have different game play curves 40 for different gaming sessions.

At 306, method 300 may include accessing a game signature function for the game. Game server 106 access a game signature functions 24 for the requested game 12 from the local cache 32. Game signature function 24 may identify an optimal game play curve for game 12 under good network conditions. An optimal game play curve may represent over a plurality of game sessions how a user (e.g., an expert player, a new gamer, and/or a casual gamer) provides input via a game controller that best achieves the mission or end result of the game the user is playing. The optimal game play curve may use a plurality of factors in gauging an optimal game play curve. In one example, the optimal game play curve may be represented by plotting the input frame and bytes count of the input provided via the game controller by the user plotted against time on an X-axis. In an implementation, game server 106 may save the game signature function 24 for a cohort associated with the user. For example, if the user is a causal gamer, game server 106 may save the game signature function 24 for causal gamers for game 12 in local cache 32.

At 308, method 300 may include calculating the reward function error by determining a distance between the game play curve and the game signature function. Reward function manager 34 may also determine a reward function 36 to use in aiding the reinforcement learning system 104 in understanding a success of the recommendation 20 for the channel parameters 28 for connection 18. In an implementation, the reward function 36 may include comparing the game play curve 40 to the game signature function 24 and determining a reward function error 38 in response to the comparison. The reward function error 38 may include the distance between the game play curve 40 and the game signature function 24.

As such, the game signature function 24 may be a segue between the user preferences and the channel configurations for connection 18. Reward function manager 34 may continuously learn the reward function 36 as the game play 14 progresses for the user and may use the reward function 36 for capturing subjective user preferences without requiring human intervention. Each user may have different preferences that may be learned through using the reward function 36.

Referring to FIG. 2, the reward function error 38 may be included in the rank and reward calls 30 to reinforcement learning system 104 and may be used by reinforcement learning system 104 to modify and/or change the recommendation for the channel parameters 28.

At 222, method 200 may include receiving updated context information for the client device. Context information 16 may dynamically change as the context of client device 102 and/or the user changes. For example, the network may go down or the user may move geographic locations, resulting in changes to the context information 16. Client device 102 may periodically send the context information 16 to game server 106 at a predetermined time interval (e.g., every five or ten seconds) while game 12 is being streamed to client device 102. As such, client device 102 may provide updated context information 16 for client device 102 throughout the duration of the game play 14 in response to a predefined frequency and/or triggers for sending the updated context information 16. In an implementation, the updated context information 16 may be sent using rank and reward calls. In addition, client device 102 may be triggered, or otherwise forced, to send the context information 16 to game server 106 in response to changes in the context. For example, a user switching from a Wi-Fi network to cellular network may trigger the sending of context information 16 to game server 106.

At 224, method 200 may include sending a new rank and reward call with the updated context information, the user vector, item vector 23, and the reward function error. Channel manager 26 may receive the context information 16 from client device 102 and may send a new rank and reward call 30 to reinforcement learning system 104 at a predetermined time interval for a new recommendation 20 for the channel parameters 28 for connection 18. A plurality of rank and reward calls 30 may be sent to reinforcement learning system 104 throughout the duration of game play 14 at predetermined time intervals in response to a predefined frequency and/or triggers for sending the rank and reward calls 30. For example, in a one-hour game, new rank and reward calls 30 may be sent every ten seconds. The new rank and reward call 30 may include the context information 16, the user vector 22, item vector 23, and the reward function error 38.

At 226, method 200 may include receiving a recommendation for the channel parameters for the connection. Reinforcement learning system 104 may use the information provided in the rank and reward call 30 to make a new recommendation 20 for the channel parameters 28 for connection 18. The new recommendation 20 may include changing the values of the channel parameters 28 and/or maintaining the values of the channel parameters 28. Reinforcement learning system 104 may reply to the rank and reward call 30 with the new recommendation 20 for the values of the channel parameters 28.

In an implementation, reinforcement learning system 104 may use the reward function error 38 and/or the information received to continuously learn so that the recommendations 20 for the channel parameters 28 for connection 18 may improve in response to learning from outcomes from previous recommendations 20. In addition, reinforcement learning system 104 may use information learned from other users in cloud computing system 114 in generating recommendations 20. A plurality of game servers 106 may communicate with reinforcement learning system 104 and reinforcement learning system 104 may use the information learned from each game server 106 in generating recommendations 20.

At 228, method 200 may include determining whether to change the channel parameters. Channel manager 26 may receive the recommendation 20 from reinforcement learning system 104 and may use the recommendation to determine whether to modify the channel parameters. If the recommendation recommends maintaining the values, method 200 may proceed to 214.

At 230, method 200 may include modifying the value of the channel parameters. If the recommendation recommends adjusting or otherwise modifying the values for the channel parameters 28, channel manager 26 may modify the channel parameters 28 of connection 18 in response to the recommended values.

At 232, method 200 may include using the modified channel parameters to stream the game. Channel manager 26 may continue to adjust the channel parameters 28 of connection 18 in response to recommendations 20 provided by reinforcement learning system 104 and use the modified channel parameters to stream game 12 until the reward function error 38 is within a threshold level and/or a request to stop game play 14 is received.

As such, method 200 may be used to personalize

Figure 4:
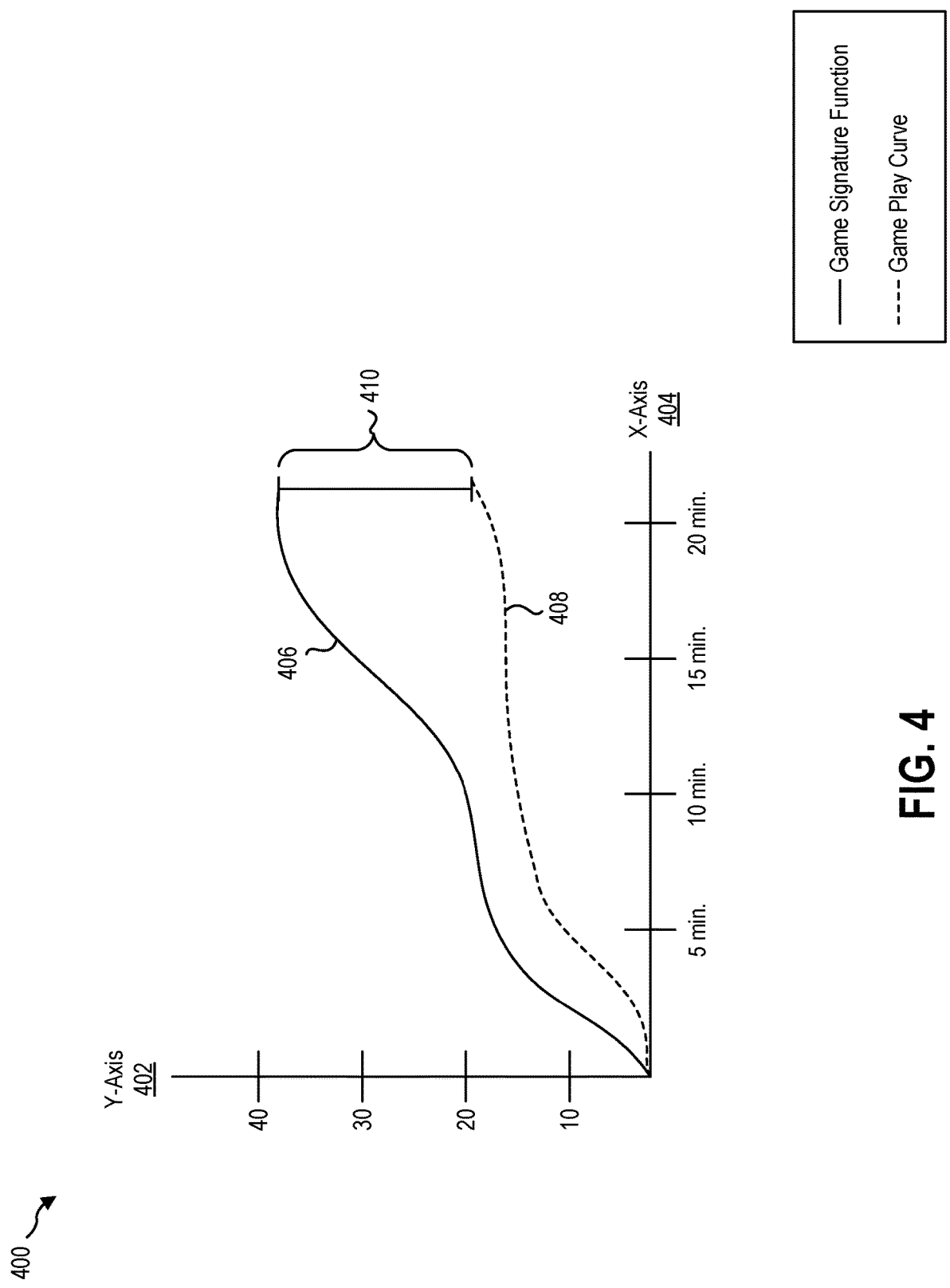
FIG. 4 illustrates an example graph with an example game signature function and a game play curve in accordance with an implementation of the present disclosure.

Referring now to FIG. 4, an example graph 400 illustrates an overlay of an example game signature function curve 406 to a game play curve 408. For example, the values in the game signature function curve 406 may be derived across all power gamers before being used in the game signature function curve 406. The y-axis 402 may illustrate the input responsiveness of the user actions during game play. For example, the y-axis 402 may track an optimum mode value for input frame count or an average combined mode value for bytes and the input frame received count. The x-axis 404 may track the duration of game play. For example, the x-axis 404 may track the duration of game play in minutes. While the game signature function curve 406 and the game play curve 408 are illustrated as a line, it should be appreciated that any shape or type of curves may be used to represent the game signature function curve 406 and/or the game play curve 408.

The distance 410 between the game signature function curve 406 and the game play curve 408 may illustrate the reward function error 38 (FIG. 1) calculated by reward function manager 34 (FIG. 1). The distance 410 between the game signature function curve 406 and the game play curve 408 at time 20 minutes may be used by the reinforcement learning system 104 to understand that the recommended adjustments to the channel parameters 28 did not lower the distance 410, but instead, increased the distance 410 from a previous game time duration (e.g., time 10 minutes). As such, the reinforcement learning system 104 may use the information provided about the distance 410 to recommend different adjustments to the channel parameters 28 and attempt to lower the distance 410 between the game play curve 408 and the game signature function curve 406 with the next recommended adjustments to the channel parameters 28.

Figure 5:
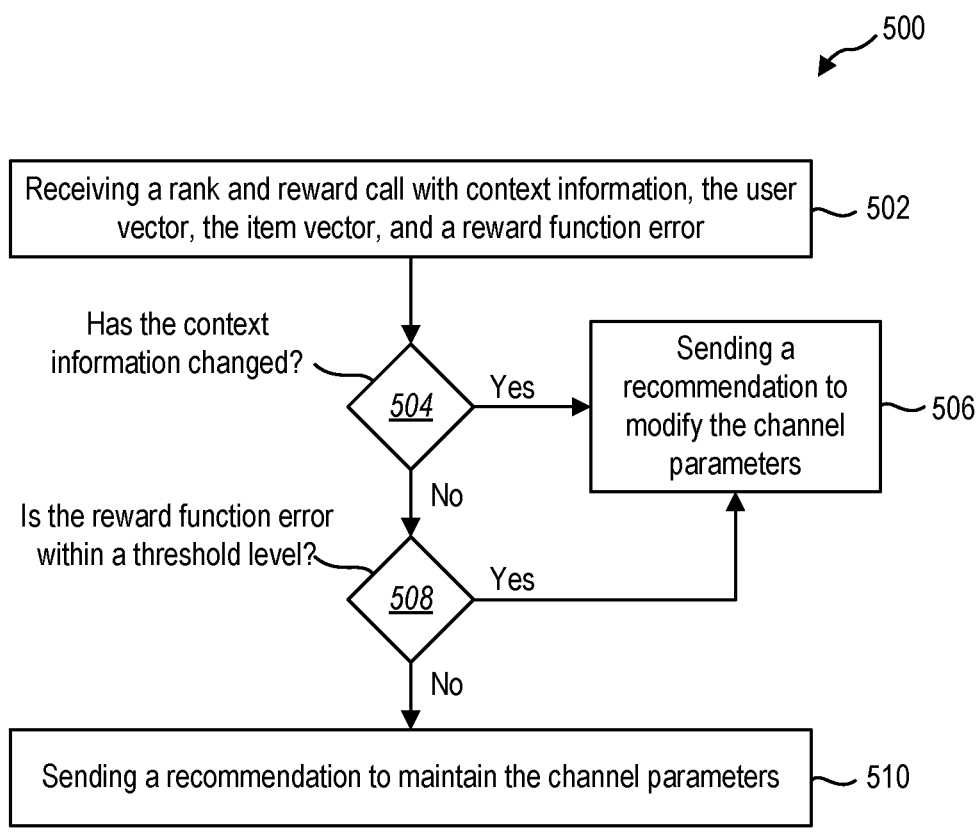
FIG. 5 illustrates an example method flow for determining recommendations for channel parameters in accordance with an implementation of the present disclosure.

Referring now to FIG. 5, an example method 500 may be used by reinforcement learning system 104 for determining a recommendation 20 (FIG. 1) for the channel parameters 28 (FIG. 1). The actions of method 500 may be discussed below with reference to the architectures of FIG. 1.

At 502, method 500 may include receiving a rank and reward call with context information, the user vector, the item vector, and a reward function error. Reinforcement learning system 104 may use the information provided in the rank and reward call 30 to make a recommendation 20 for the channel parameters 28 for connection 18. User vector 22 and/or item vector 23 may be used to provide more user information and/or game features to reinforcement learning system 104, and thus, improving the functioning of reinforcement learning system 104 by providing more features for reinforcement learning system 104 to use in personalizing the channel parameters 28.

At 504, method 500 may include determining whether the context information has changed. Reinforcement learning system 104 may determine whether the context information 16 for the client device 102 and/or user has changed. For example, the rank and reward call 30 may include updated context information 16 for the client device 102 and/or the user.

At 506, method 500 may include sending a recommendation to modify the channel parameters. When the context information 16 changes, reinforcement learning system 104 may provide a recommendation 20 with new values for the channel parameters 28. For example, the updated context information 16 may indicate spikes in the network jitter, as such, the reinforcement learning system 104 may recommend switching from a short-term rendering mode to a long-term rendering mode.

The reinforcement learning system 104 may recommend changing all values of the channel parameters 28 and/or may recommend changing a subset of the values of the channel parameters 28 in response to the information and/or feedback provided to the reinforcement learning system 104 through the rank and reward calls 30.

At 508, method 500 may include determining whether the reward function error is within a threshold level. Reinforcement learning system 104 may continue to provide recommendations 20 for adjusting the channel parameters 28 until the reward function error 38 is within a threshold level. In an implementation, the threshold level may be a positive number. For example, if the reward function error 38 is negative (e.g., there is a large distance between the game play curve 40 and the game signature function 24), the reinforcement learning system 104 may use this feedback to continue to recommend adjustments to the channel parameters 28 to attempt to lower the distance between the game play curve 40 and the game signature function 24 to move the reward function error 38 towards a positive number. By switching the channel conditions, reinforcement learning system 104 may improve the streaming conditions of game 12 to the user. Thus, the reinforcement learning system 104 may use the changes in the reward function error 38 as positive and/or negative feedback on the recommended changes for the channel parameters and may modify a next round of recommendations in response to the feedback provided by the reward function error 38.

At 510, method 500 may include sending a recommendation to maintain the channel parameters. Reinforcement learning system 104 may send a recommendation 20 to maintain the channel parameters 28 in response when the context information has stayed the same and/or the reward function error is within a threshold level.

As such, method 500 may be used by the reinforcement learning system 104 to continuously learn so that the recommendations 20 for the channel parameters 28 for connection 18 may improve in response to learning from outcomes from previous recommendations 20. As more user information and/or game features are provided to reinforcement learning system 104 using, for example, user vector 22 and/or item vector 23, the recommendations 20 may improve. In addition, reinforcement learning system 104 may use information learned from other users in cloud computing system 114 in generating recommendations 20. A plurality of game servers 106 may communicate with reinforcement learning system 104 and reinforcement learning system 104 may use the information learned from each game server 106 in generating recommendations 20.

Figure 6:
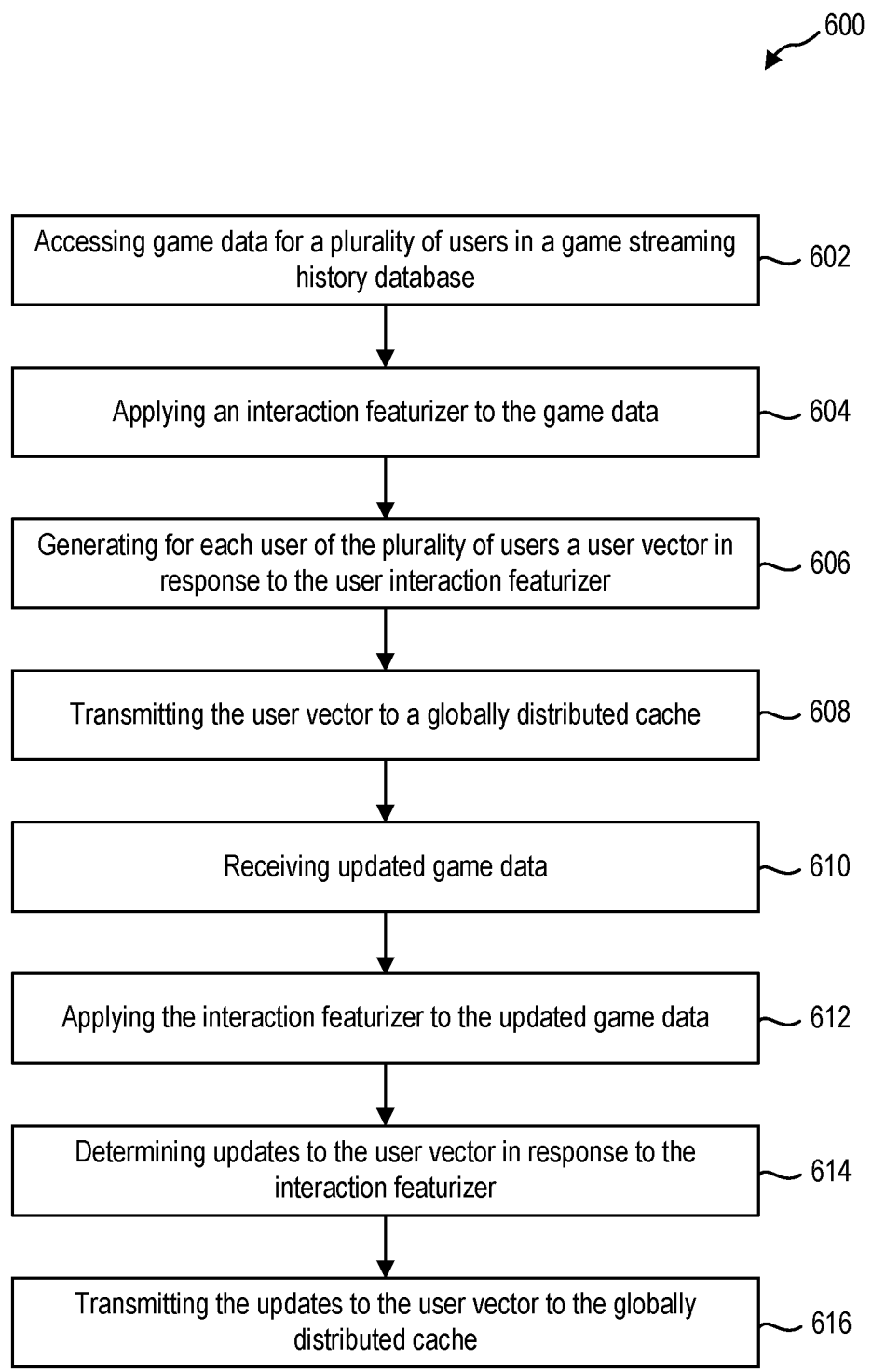
FIG. 6 illustrates an example method flow for creating user vectors in accordance with an implementation of the present disclosure.

Referring now to FIG. 6, an example method 600 may be used by a trained machine learning model for creating user vectors 22 (FIG. 1) for the users of cloud computing system 114 (FIG. 1). The actions of method 600 may be discussed below with reference to the architectures of FIG. 1.

At 602, method 600 may include accessing game data for a plurality of users in a game streaming history database. A trained machine learning model may access game data 15 stored in a game streaming history datastore 112 in communication with cloud computing system 114. Game data 15 may include information acquired or otherwise collected for all games 12 in cloud computing system 114 and/or all users in cloud computing system 114. Examples of game data 15 may include, but are not limited to, game names, game content, an amount of time users are playing games, an amount of money spent on games, and/or actual game play of users. For example, game data 15 may include information for millions of game sessions that occurred using cloud computing system 114.

At 604, method 600 may include applying an interaction featurizer to the game data. The trained machine learning model may apply an interaction featurizer 17 to analyze game data 15 and generate user vectors 22 for each user of the cloud computing system 114. In an implementation, the interaction featurizer 17 may be a deep learning network. Examples of deep machine learning networks may include, but are not limited to, wide and deep learning and/or Extreme Deep Factorization Machine (xDeepFM). Another example of the machine learning model may include Convolutional Neural Networks (CNN). The interaction featurizer 17 may run at a predetermined time period to ensure the user vectors 22 reflect the latest gaming information received for the users. For example, the interaction featurizer 17 may run every four hours. Another example may include the interaction featurizer 17 running once a day.

At 606, method 600 may include generating for each user of the plurality of users a user vector in response to the interaction featurizer. The trained machine learning model may generate user vectors 22 in response to applying the interaction featurizer 17 to the game data 15.

The user vectors 22 may provide a mathematical representation of the gaming history for the users of cloud computing system 114. Each user of the gaming system may have an associated user vector 22. User vectors 22 may be a multidimensional array of numbers or real values that provides a condensed representation of the game play for the user for every game 12 played by the user. For example, user vectors 22 may embed one or more user actions during game play. In addition, user vectors 22 may provide a variety of information about the user, such as, but not limited to, a level of play for the user, an amount of money the user spends on games, an amount of time a user plays game, types of games the user plays, and/or a speed of play of the user. In addition, the one or more user vectors 22 may illustrate similarities between groups of users. As such, user vectors 22 may provide a summary of the total gaming history for each user of the cloud computing system 114.

At 608, method 600 may include transmitting the user vectors to a globally distributed cache. The one or more user vectors 22 may be distributed to globally distributed cache 108 in cloud computing system 114.

At 610, method 600 may include receiving updated game data. The game data 15 may be continuously updated in game streaming history datastore 112 as games 12 are created and/or played by users of cloud computing system 114.

At 612, method 600 may include applying the interaction featurizer to the updated game data. As new game data 15 is received from game servers 106 and/or game data 15 is updated, the interaction featurizer 17 may be applied to game data 15. The interaction featurizer 17 may be applied to a large volume of newly added game data 15.

At 614, method 600 may include determining updates to the user vector in response to the interaction featurizer. The user vectors 22 may be updated and/or revised as necessary in response to the output of the interaction featurizer 17. As the user interaction history changes, the user vectors 22 may be updated to reflect the changes to the user interaction history changes.

At 616, method 600 may include transmitting the updates to the user vector to the globally distributed cache. The globally distributed cache 108 may include continuously updated user vectors 22 that provide a game history summary for each user of cloud computing system 114.

Method 600 may be used to generate a summary describing a user interaction history of each user of the cloud computing system 114.

Figure 7:
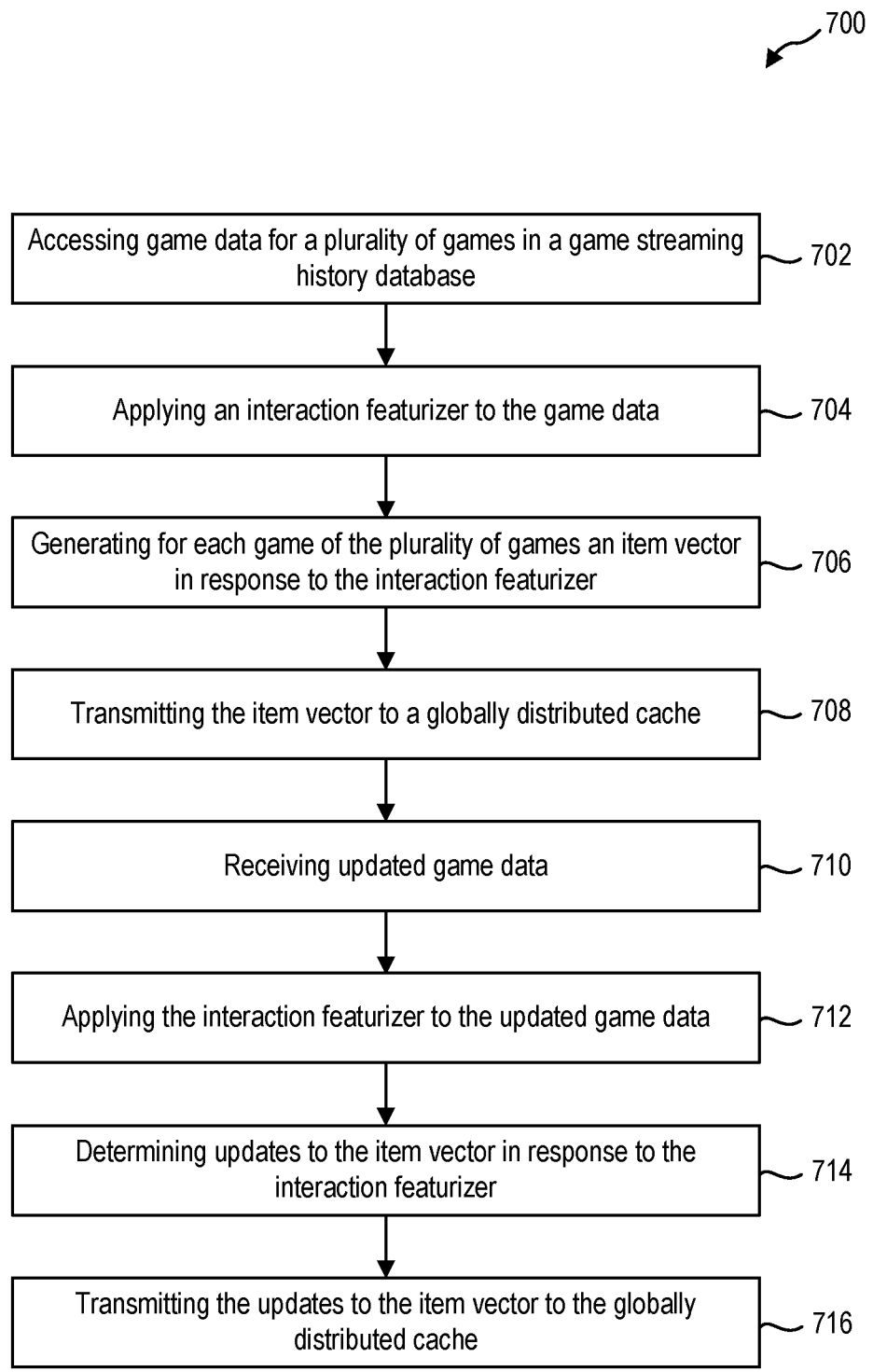
FIG. 7 illustrates an example method flow for creating item vectors in accordance with an implementation of the present disclosure.

Referring now to FIG. 7, an example method 700 may be used by a trained machine learning model for creating item vectors 23 (FIG. 1) for the users of cloud computing system 114 (FIG. 1). The actions of method 700 may be discussed below with reference to the architectures of FIG. 1.

At 702, method 700 may include accessing game data for a plurality of games in a game streaming history database. A trained machine learning model may access game data 15 stored in a game streaming history datastore 112 in communication with cloud computing system 114. Game data 15 may include information acquired or otherwise collected for all games 12 in cloud computing system 114 and/or all users in cloud computing system 114. Examples of game data 15 may include, but are not limited to, game names, game content, an amount of time users are playing games, an amount of money spent on games, and/or actual game play of users. For example, game data 15 may include information for millions of game sessions that occurred using cloud computing system 114.

At 704, method 700 may include applying an interaction featurizer to the game data. The trained machine learning model may apply an interaction featurizer 17 to analyze game data 15 and generate item vectors 23 for each game 12 of the cloud computing system 114. In an implementation, the interaction featurizer 17 may be a deep learning network. Examples of deep machine learning networks may include, but are not limited to, wide and deep learning and/or Extreme Deep Factorization Machine (xDeepFM). Another example of the machine learning model may include Convolutional Neural Networks (CNN). The interaction featurizer 17 may run at a predetermined time period to ensure the item vectors 23 reflect the latest gaming information received for the games. For example, the interaction featurizer 17 may run every four hours. Another example may include the interaction featurizer 17 running once a day.

At 706, method 700 may include generating for each game of the plurality of games an item vector in response to the interaction featurizer. The trained machine learning model may generate item vectors 23 in response to applying the interaction featurizer 17 to the game data 15.

Item vectors 23 may provide additional game information and/or game features associated with one or more games 12. For example, item vectors 23 may embed one or more user actions during game play. In addition, item vectors 23 may relate to other items of interest relating to games 12 of cloud computing system 114. Item vectors 23 may be a multidimensional array of numbers that provide a condensed representation of the game information and/or game sessions for every game 12 of cloud computing system 114. Each game 12 of the gaming system may have an associated item vector 23. In an implementation, games 12 may have a plurality of item vectors 23 associated with the users. The one or more item vectors 23 may illustrate similarities between games 12 and/or gaming sessions. In addition, the one or more item vectors 23 may illustrate differences between games 12 and/or gaming sessions. The item vectors 23 may provide a summary of game information for each game 12 of the cloud computing system 114.

At 708, method 700 may include transmitting the item vectors to a globally distributed cache. The one or more item vectors 23 may be distributed to globally distributed cache 108 in cloud computing system 114.

At 710, method 700 may include receiving updated game data. The game data 15 may be continuously updated in game streaming history datastore 112 as games 12 are created and/or played by users of cloud computing system 114. For example, a large amount of game sessions (e.g., hundreds or thousands) may be added to the game data 15 daily.

At 712, method 700 may include applying the interaction featurizer to the updated game data. As new game data 15 is received from game servers 106 and/or game data 15 is updated, the interaction featurizer 17 may be applied to game data 15. The interaction featurizer 17 may be applied to a large volume of newly added game data 15.

At 714, method 700 may include determining updates to the item vector in response to the interaction featurizer. The item vectors 23 may be updated and/or revised as necessary in response to the output of the interaction featurizer 17. As the game history changes, the item vectors 23 may be updated to reflect the changes to the game history.

At 716, method 700 may include transmitting the updates to the item vector to the globally distributed cache. The globally distributed cache 108 may include continuously updated item vectors 23 that provide a game summary for each game of cloud computing system 114.

Method 700 may be used to generate a summary describing game information for each game 12 of cloud computing system 114.

Figure 8:
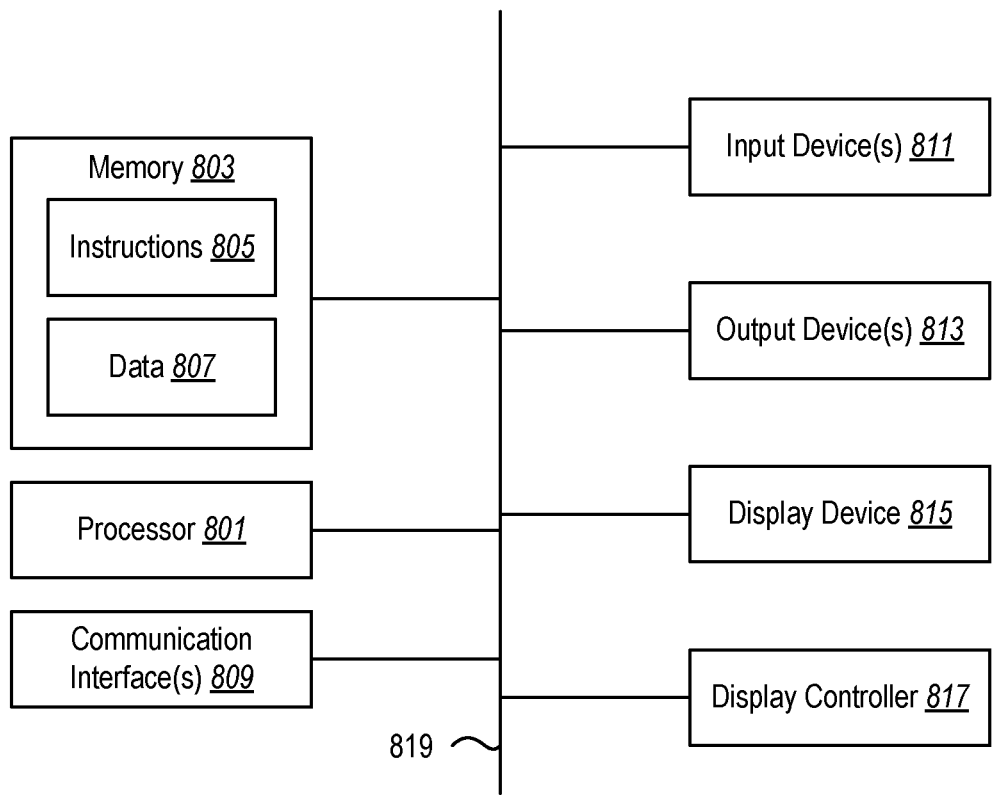
FIG. 8 illustrates certain components that may be included within in a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A server, comprising:
a memory to store data and instructions;
at least one processor operable to communicate with the memory, wherein the at least one processor is operable to:
establish a connection with a client device to stream a game to the client device;
receive context information from the client device;
send, to a reinforcement learning system, a rank and reward call for a recommendation for channel parameters for the connection, wherein the rank and reward call includes the context information, a user vector, and an item vector;
receive, from the reinforcement learning system, the recommendation for the channel parameters in response to the rank and reward call;
use the recommendation to set a value of the channel parameters to stream the game to the client device;
access a game signature function that represents optimal game play for a cohort of users for the game learned through machine learning from analyzing game data stored in a game streaming history datastore, wherein the cohort of users is associated with a user of the client device and different game signature functions are learned for different cohorts of users for the game based on a level of play of the game by each cohort of users;
use the game signature function to determine a reward function, wherein the reward function captures user preferences for game play; and
adjust the value of the channel parameters to stream the game to the client device to maximize the reward function.

2. The server of claim 1, wherein the user vector is a multidimensional array of numbers that provides a summary of a gaming history of the user of the client device.

3. The server of claim 2, wherein the user vector is learned through the machine learning from analyzing the game data stored in the game streaming history datastore.

4. The server of claim 1, wherein the item vector is a multidimensional array of numbers that provides a summary of game information for the game.

5. The server of claim 1, wherein the at least one processor is further operable to:
determine a reward function error for the channel parameters by calculating a distance between a game play curve for the game and the game signature function, wherein the game play curve represents a current game play of the user.

6. The server of claim 5, wherein the at least one processor is further operable to:
receive updated context information from the client device;
send, to the reinforcement learning system, a new rank and reward call for a new recommendation for the channel parameters, wherein the new rank and reward call includes the updated context information, the reward function error, the user vector, and the item vector; and
receive, from the reinforcement learning system, the new recommendation for the channel parameters.

7. The server of claim 6, wherein the reinforcement learning system recommends adjustments to the channel parameters until a value of the reward function error is within a threshold level.

8. The server of claim 6, wherein the at least one processor is further operable to:
modify the value of the channel parameters in response to the new recommendation; and
use the value of the channel parameters to stream the game to the client device.

9. The server of claim 6, wherein the at least one processor is further operable to:
receive the updated context information from the client device at a predetermined time interval; and
send the new rank and reward call at the predetermined time interval.

10. The method of claim 1, wherein different game signature functions are learned for each game that each of the cohort of users play.

11. A method comprising,
establishing a connection between a game server and a client device to stream a game to the client device;
receiving context information from the client device;
sending, to a reinforcement learning system, a rank and reward call for a recommendation for channel parameters for the connection, wherein the rank and reward call includes the context information, a user vector, and an item vector;
receiving, from the reinforcement learning system, the recommendation for the channel parameters in response to the rank and reward call;
using the recommendation to set a value of the channel parameters to stream the game to the client device;
accessing a game signature function that represents optimal game play for a cohort of users for the game learned through machine learning from analyzing game data stored in a game streaming history datastore, wherein the cohort of users is associated with a user of the client device and different game signature functions are learned for different cohorts of users for the game based on a level of play of the game by each cohort of users;
using the game signature function to determine a reward function, wherein the reward function captures user preferences for game play; and
adjusting the value of the channel parameters to stream the game to the client device to maximize the reward function.

12. The method of claim 11, wherein the user vector is a multidimensional array of numbers that provides a summary of a gaming history of the user of the client device.

13. The method of claim 12, wherein the user vector is learned through the machine learning from analyzing the game data stored in the game streaming history datastore.

14. The method of claim 11, further comprising:
determining a reward function error for the channel parameters by calculating a distance between a game play curve for the game and the game signature function.

15. The method of claim 14, wherein the game play curve represents a current game play of the user.

16. The method of claim 14, further comprising:
receiving updated context information from the client device;
sending, to the reinforcement learning system, a new rank and reward call for a new recommendation for the channel parameters, wherein the new rank and reward call includes the updated context information, the reward function error, the user vector, and the item vector; and
receiving, from the reinforcement learning system, the new recommendation for the channel parameters.

17. The method of claim 16, wherein the reinforcement learning system recommends adjustments to the channel parameters until a value of the reward function error is within a threshold level.

18. The method of claim 16, further comprising:
modifying the value of the channel parameters in response to the new recommendation; and
using the value of the channel parameters to stream the game to the client device.

19. The method of claim 16, further comprising:
receiving the updated context information from the client device at a predetermined time interval; and
sending the new rank and reward call at the predetermined time interval.

20. A computer-readable medium storing instructions executable by a computer device, comprising:
at least one instruction for causing the computer device to establish a connection with a client device to stream a game to the client device;
at least one instruction for causing the computer device to receive context information from the client device;
at least one instruction for causing the computer device to send, to a reinforcement learning system, a rank and reward call for a recommendation for channel parameters for the connection, wherein the rank and reward call includes the context information, a user vector, and an item vector;
at least one instruction for causing the computer device to receive, from the reinforcement learning system, the recommendation for the channel parameters in response to the rank and reward call;
at least one instruction for causing the computer device to use the recommendation to set a value of the channel parameters to stream the game to the client device;
at least one instruction for causing the computer device to access a game signature function that represents optimal game play for a cohort of users for the game learned through machine learning from analyzing game data stored in a game streaming history datastore, wherein the cohort of users is associated with a user of the client device and different game signature functions are learned for different cohorts of users for the game based on a level of play of the game by each cohort of users;
at least one instruction for causing the computer device to use the game signature function to determine a reward function, wherein the reward function captures user preferences for game play; and
at least one instruction for causing the computer device to adjust the value of the channel parameters to stream the game to the client device to maximize the reward function.

* * * * *

UNITED STATES PATENT AND TRADEMARK OFFICE
CERTIFICATE OF CORRECTION

| | | |
|---|---|---|
| PATENT NO. | : 11,648,467 B2 | Page 1 of 1 |
| APPLICATION NO. | : 16/791970 | |
| DATED | : May 16, 2023 | |
| INVENTOR(S) | : Mayank Mishra | |

It is certified that error appears in the above-identified patent and that said Letters Patent is hereby corrected as shown below:

In the Specification

Column 16, Line 55, after "As such, method 200 may be used to personalize" insert --channel parameters for streaming content.--

Signed and Sealed this
Seventeenth Day of December, 2024

Derrick Brent
*Acting Director of the United States Patent and Trademark Office*